UNITED STATES PATENT OFFICE.

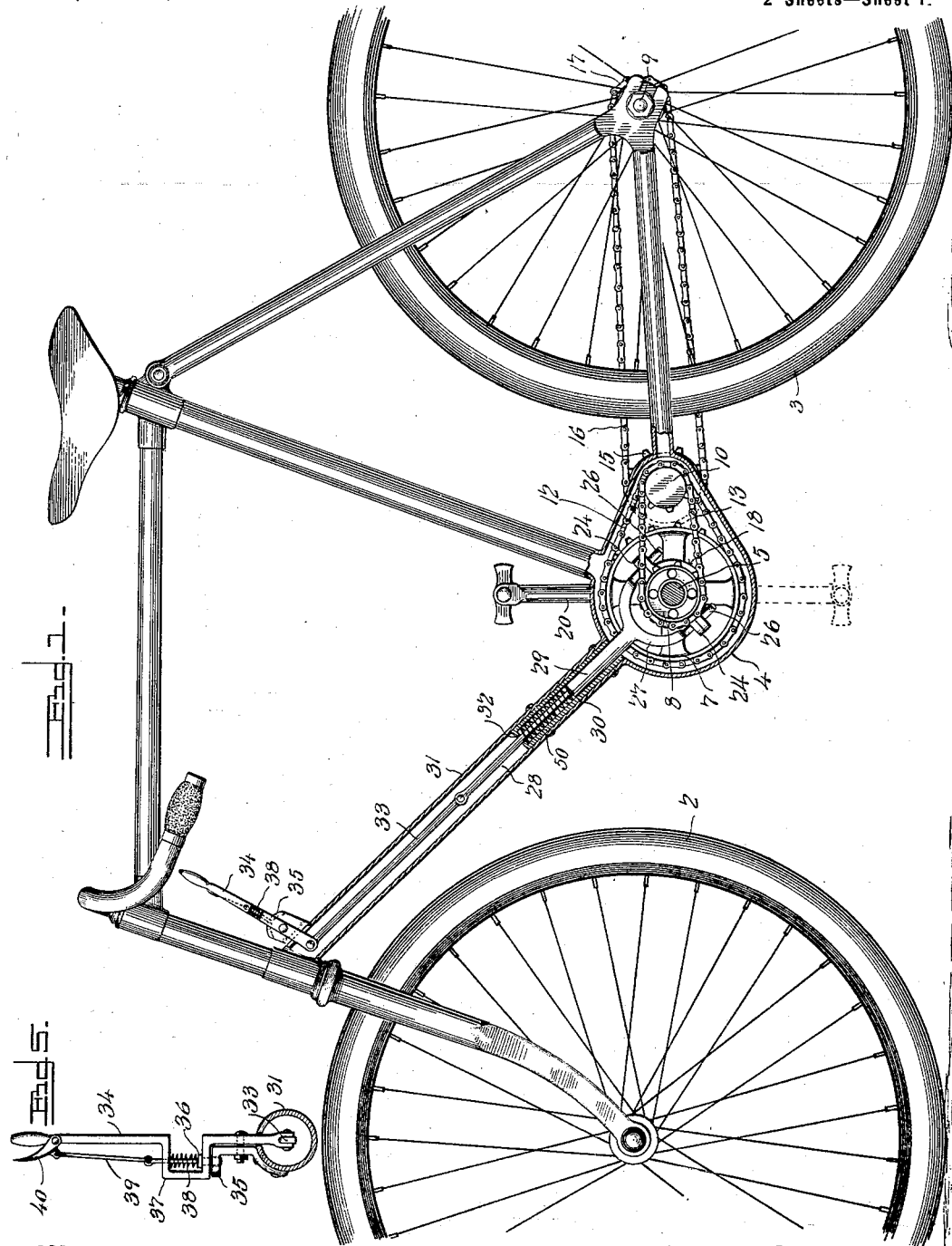

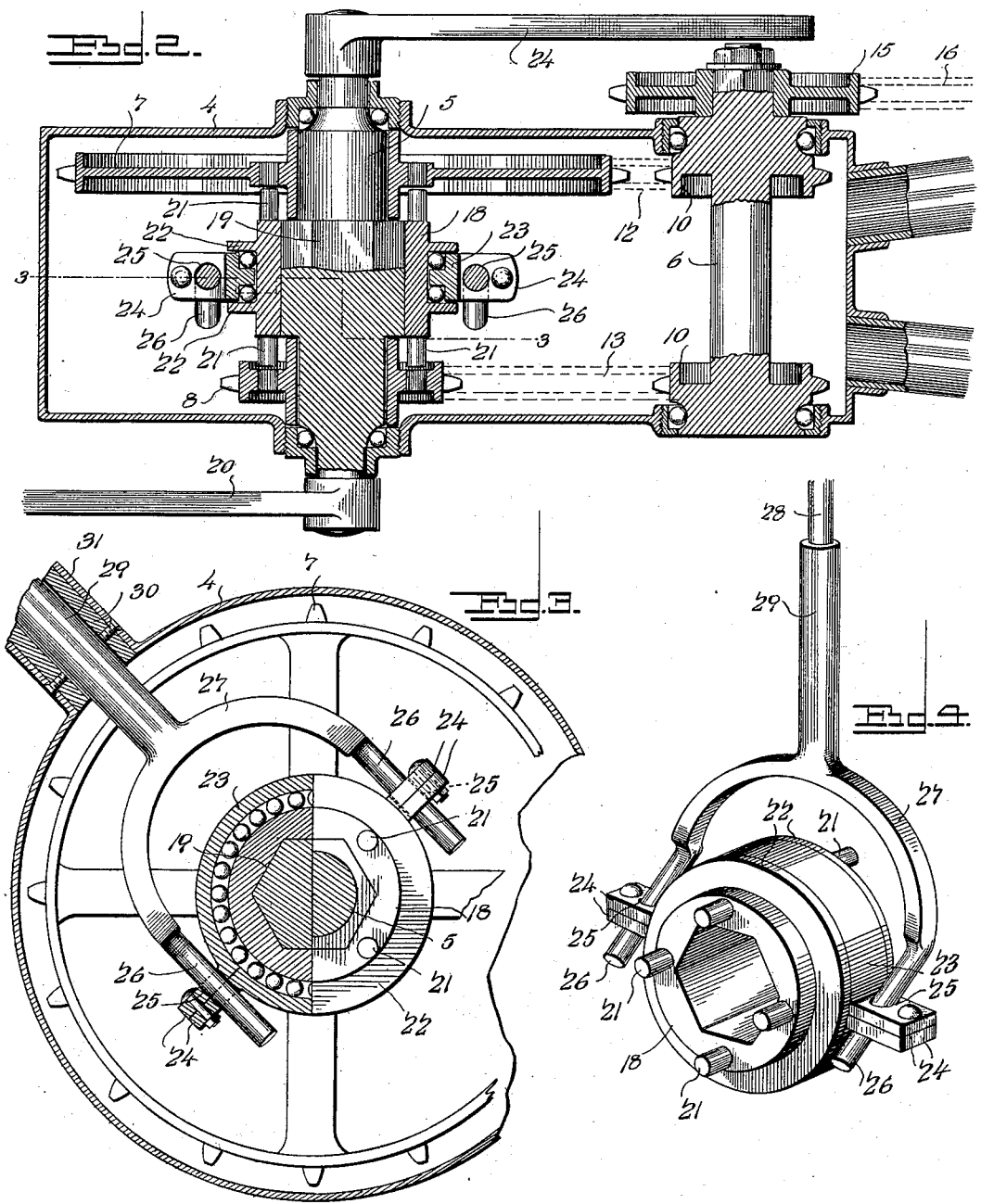

WILLIAM LANE AND ALFRED DONEY, OF PEN ARGYL, PENNSYLVANIA, ASSIGNORS OF ONE-THIRD TO LEONIDAS W. MORSS, OF SCRANTON, PENNSYLVANIA.

DRIVING MECHANISM FOR CYCLES.

SPECIFICATION forming part of Letters Patent No. 628,585, dated July 11, 1899.

Application filed March 24, 1899. Serial No. 710,340. (No model.)

*To all whom it may concern:*

Be it known that we, WILLIAM LANE and ALFRED DONEY, citizens of the United States, residing at Pen Argyl, in the county of Northampton and State of Pennsylvania, have invented a new and useful Driving Mechanism for Cycles, of which the following is a specification.

This invention relates to that class of driving mechanisms for cycles involving differential-speed driving devices; and the object of the invention is to provide an apparatus of the character specified including simple and easily-operable means for obtaining instant changes in the speed of the cycle or for throwing the driving mechanism out of action, so that the rider can coast.

With these ends in view the invention consists in the novel combination of elements and in the construction and arrangement of parts, which will be hereinafter fully described and claimed.

To enable others to understand the invention, we have illustrated the preferred embodiment thereof in the accompanying drawings, forming a part of this specification, and in which—

Figure 1 is a side elevation of a bicycle equipped with differential-speed driving mechanism constructed in accordance with the invention and with parts broken away to show more clearly said mechanism and certain of the devices for controlling the operation of the primary driving members. Fig. 2 is a sectional plan view, the section being taken on the line 2 2, Fig. 1, and the clutch, which couples the driving members alternately to the crank-axle, being represented as occupying its intermediate or ineffective position. Fig. 3 is a transverse sectional view taken on the line 3 3, Fig. 2. Fig. 4 is a perspective view of the clutch, the clutch-shifting device, and the intermediate ring. Fig. 5 is a sectional front elevation of the mechanism employed by the rider for operating the clutch-shifting device.

Like characters denote like and corresponding parts in each of the several figures of the drawings.

It is obvious that the differential-speed mechanism constituting the subject-matter of the present invention can be applied to different kinds of foot-propelled and analogous vehicles, but the same is represented as mounted on a bicycle of the familiar diamond form and the front and rear wheels of which are designated, respectively, by 2 and 3, and the differential-speed mechanism is housed within a casing 4, secured to the framework of the cycle intermediate the front and rear wheels.

The casing supports the axles or shafts 5 and 6, and the shaft 5 preferably sustains the differential-speed driving devices, represented as consisting of sprocket-wheels 7 and 8, the sprocket-wheel 7 being materially larger than the sprocket-wheel 8, and it is employed when the high speed is desired. These two sprocket-wheels are loose upon the front axle 5 and are adapted to be coupled thereto through the medium of a clutch, whereby they can be alternately thrown into action for the purpose of rotating the axle 9 of the rear wheel 3, and consequently said wheel, to drive the cycle through the agency of intermediate mechanism.

The intermediate axle 6 is provided with the sprocket-wheels 10, keyed to said axle at opposite sides thereof and in line, respectively, with the sprocket-wheels 7 and 8 and connected, respectively, thereto by means of chains 12 and 13. The sprocket-wheels 10 are conveniently formed in one piece with the longitudinal axle 6. The intermediate axle carries a sprocket-wheel 15, connected by the sprocket-chain 16 to the sprocket-wheel 17 on the rear-wheel axle 9, and it will be evident that when the loose sprocket-wheels 7 and 8 are alternately connected to their supporting-axle 5 the latter will be rotated, thereby serving to drive the rear wheel either fast or slow, in accordance with the primary sprocket-wheel which is in action.

All of the rotative parts hereinbefore described are mounted upon ball-bearings, which serve their usual function.

A clutch, as 18, is mounted for sliding movement longitudinally of the driving-axle 5 and is rotative with said axle and is adapted to be connected to either of the primary sprocket-wheels or to occupy a position midway between them, and this axle 5 is polygonal, as at 19, at the place where the clutch is supported thereon, the faces serving as convenient means to lock the clutch to the axle, although it is evident that other means can be employed for keying the clutch to the axle.

The axle is provided at its opposite extremities with cranks 20 of ordinary construction provided with any desired pattern of pedals by which they can be actuated.

The clutch 18 consists of a sliding sleeve having projecting pins 21 upon its opposite faces adapted to engage in corresponding openings in the adjacent faces of the primary sprocket-wheels, and the clutch-sleeve has two peripheral annular flanges 22, the space between the same constituting a groove to receive the split ring or collar 23. The two sections of the split ring have ears 24 extending outwardly and oppositely therefrom, and the ears on one section fit against those on the other and are adapted to receive screws or other fastening devices to hold the parts in assembled relation, and this ring is adapted to be operated laterally by means of an actuating device supported for reciprocation transversely of the crank-axle 5. The ears 24 have diagonal registering openings 25 to receive the correspondingly-disposed diagonal pins 26 at the opposite ends of the segmental bar 27, which partly surrounds the ring 23 and which is connected at its middle with the stem 28 of different diameters and which is supported for sliding movement. The larger portion 29 of the stem slides in the sleeve 30, secured in the lower end of the front tube 31 of the bicycle, and the smaller portion of the stem projects through the closed upper end 32 of said sleeve, as shown in Fig. 1.

In Fig. 2 the parts are shown as being in their idle positions, the clutch 18 occupying a place midway between the primary sprocket-wheels 7 and 8, so that by thrusting down upon the stem 28 the said clutch, through the agency of the angularly-disposed pins 26 acting against the ring 23, fitted in the groove on the clutch, will act to throw the latter into engagement with the large sprocket-wheel, and the elevation of said stem will serve to throw the clutch into engagement with the small gear, whereby fast or slow speeds can be secured. When the clutch is in its intermediate position, both the sprocket-wheels will be idle, so that the rider can coast.

The link 33 is pivoted at one end to the stem 28 and is likewise jointed at its opposite end to the hand-lever 34, fulcrumed upon the steering-head tube and adapted to be operated by a rider to throw the two primary sprocket-wheels alternately into and out of action, and this hand-lever is located within convenient reach of the rider and is provided with means for holding it in a fixed position, thereby to maintain either one of the sprocket-wheels just mentioned in working relation. A bracket 35 is secured to the tube 31 and has perforations or openings to receive the detent or pawl 36, supported for reciprocation by the superposed parallel guides 37 on the hand-lever, and this dog is held in one of the three openings by means of the spring 38, encircling its stem and fitting against a shoulder thereon and also against the upper guide 37.

The link 39 is pivoted, respectively, to the stem of the detent 36 and to the small elbow-lever 40, pivoted at its angle near the upper end of the hand-lever. The elbow-lever when manipulated serves to elevate the detent or pawl out of the opening in which it is held, thereby to permit the shifting of the hand-lever 34 so as to throw either of the wheels 7 or 8 into action through the medium of the slidable clutch 18 and other described connections. The coiled spring 38 serves to maintain the detent or pawl in the opening in the bracket 35 in which it is seated.

The reduced portion of the stem 28 is surrounded by the coiled spring 50, (see Fig. 1,) which is disposed in the sleeve 30 and which bears against the upper closed end 32 of said tube and against the enlarged portion 29 of the stem for forcing said stem downward, thereby to hold the clutch 18 in engagement with the large sprocket-wheel 27. When the stem is elevated by the operation of the hand-lever 34, the spring will be compressed, so that when the parts are released the relaxing spring can serve to return the clutch to its primary position.

Changes in the form, proportion, size, and the minor details of construction within the scope of the appended claims may be resorted to without departing from the spirit or sacrificing any of the advantages of this invention.

Having thus described the invention, what we claim is—

1. In a driving mechanism of the class specified, the combination with an axle, of differential driving members carried by said driving-axle, a second axle provided with members operatively connected with and actuated by said driving members, a clutch slidable between the said differential driving members, a ring carried by the clutch, having diagonal perforations therein and a clutch-operating device having diagonal pins located to engage said perforations and move the clutch, substantially as described.

2. In a driving mechanism of the class specified, the combination with an axle, of two sprocket-wheels carried thereby, a second shaft provided with sprocket-wheels connected by sprocket-chains with said first-mentioned sprocket-wheels, a clutch slidable on said first-mentioned axle between the sprocket-wheels thereon, a ring carried by said clutch and provided with oppositely-disposed ears having diagonal openings, and a clutch-operating device provided with diagonal pins projecting through said openings, substantially as described.

3. In a driving mechanism of the class specified, the combination with an axle, of differential driving members carried thereby, a wheel operatively connected with said axle, a clutch slidable between said differential driving members, a ring on the clutch provided with ears having diagonal openings, a clutch-shifting device furnished with diagonally-disposed pins projecting into said openings, driving means for said clutch-shifting device, a hand-lever, and a link pivoted respectively to the hand-lever and to said clutch-shifting device, substantially as described.

4. In a driving mechanism of the class specified, the combination with an axle, of differential driving members carried thereby, a wheel operatively connected with said axle, a clutch slidable between said differential driving members, a ring on the clutch provided with ears having diagonal openings, a clutch-shifting device furnished with diagonally-disposed pins projecting into said openings, driving means for said clutch-shifting device, a hand-lever, a link pivoted respectively to the hand-lever and to said clutch-shifting device, a fixed device having openings, and a pawl on said hand-lever adapted to enter one of said openings, substantially as described.

5. In a driving mechanism of the class specified, the combination with an axle, of differential driving members carried thereby, a wheel operatively connected with said axle, a clutch slidable between said differential driving members, a ring on the clutch provided with ears having diagonal openings, a clutch-shifting device furnished with diagonally-disposed pins projecting into said opening, driving means for said clutch-shifting device, a hand-lever, a link pivoted respectively to the hand-lever and to said clutch-shifting device, a device having openings on said hand-lever, a pawl, guides on the hand-lever for said pawl, a spring acting respectively against one of the guides and against said pawl, and a second lever mounted upon the hand-lever and operatively connected to said pawl, substantially as described.

6. In a driving mechanism, the combination with an axle, of differential driving members carried thereby, a clutch slidable between said driving members, a ring carried by the clutch and having diagonal openings therein, and a reciprocatory clutch-shifting device provided with pins disposed at an angle to the path of said clutch-shifting device and entering said openings to move the clutch across said path, substantially as described.

7. In a driving mechanism of the class specified, the combination with an axle having a polygonal portion, of differential driving members carried by said axle, a clutch slidable on said polygonal portion and between said driving members, a ring carried by the clutch and provided with oppositely-disposed ears having diagonal openings, and a clutch-shifting device supported for reciprocation transversely of said axle and having a segmental portion provided with pins fitting in said openings and disposed at the same angle, substantially as described.

In testimony that we claim the foregoing as our own we have hereto affixed our signatures in the presence of two witnesses.

WILLIAM LANE.
ALFRED DONEY.

Witnesses:
ROBERT KELLON,
ALFRED U. WEAVER.